(12) United States Patent
Hefner et al.

(10) Patent No.: US 9,169,567 B2
(45) Date of Patent: Oct. 27, 2015

(54) COMPONENTS HAVING TAB MEMBERS

(75) Inventors: Rebecca Evelyn Hefner, Fountain Inn, SC (US); Paul Stephen Dimascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 749 days.

(21) Appl. No.: 13/436,420

(22) Filed: Mar. 30, 2012

(65) Prior Publication Data

US 2013/0260169 A1 Oct. 3, 2013

(51) Int. Cl.
*B32B 15/01* (2006.01)
*C23C 28/02* (2006.01)

(52) U.S. Cl.
CPC ............. *C23C 28/021* (2013.01); *C23C 28/023* (2013.01); *Y10T 428/1241* (2015.01)

(58) Field of Classification Search
USPC ................................................. 428/616, 617
See application file for complete search history.

(56) References Cited

U.S. PATENT DOCUMENTS

| | | | |
|---|---|---|---|
| 4,109,031 A | 8/1978 | Marscher | |
| 4,787,942 A | 11/1988 | Wray | |
| 5,139,389 A | 8/1992 | Eng et al. | |
| 5,509,669 A | 4/1996 | Wolfe et al. | |
| 5,540,788 A | 7/1996 | Defalco et al. | |
| 5,645,897 A | 7/1997 | Andra | |
| 6,189,891 B1 | 2/2001 | Tomita et al. | |
| 6,484,395 B1 * | 11/2002 | Marcus et al. | ................... 29/842 |
| 6,652,227 B2 | 11/2003 | Fried | |
| 6,995,334 B1 | 2/2006 | Kovacevic et al. | |
| 7,126,220 B2 * | 10/2006 | Lahiri et al. | ................... 257/734 |
| 7,195,036 B2 | 3/2007 | Burns et al. | |
| 7,238,294 B2 | 7/2007 | Koops et al. | |
| 7,423,236 B2 | 9/2008 | Suh | |
| 7,452,477 B2 | 11/2008 | Koops et al. | |
| 7,537,708 B2 | 5/2009 | Koops et al. | |
| 7,667,158 B2 | 2/2010 | Dance et al. | |
| 7,771,159 B2 | 8/2010 | Johnson et al. | |
| 7,870,738 B2 | 1/2011 | Zborovsky et al. | |
| 7,910,854 B2 | 3/2011 | Besson et al. | |
| 7,926,283 B2 | 4/2011 | Byrne et al. | |
| 2002/0006377 A1 | 1/2002 | Castner et al. | |
| 2003/0184026 A1 | 10/2003 | Wilcox et al. | |
| 2004/0251242 A1 | 12/2004 | Suh | |
| 2005/0076642 A1 | 4/2005 | Reichert | |
| 2006/0020415 A1 | 1/2006 | Hardwicke et al. | |

(Continued)

FOREIGN PATENT DOCUMENTS

EP 0377867 A2 7/1990

OTHER PUBLICATIONS

The Engineering ToolBox, (http://www.engineeringtoolbox.com/linear-expansion-coefficients-d_95.html), accessed Nov. 17, 2014.*

(Continued)

*Primary Examiner* — Mark Ruthkosky
*Assistant Examiner* — Daniel J Schleis
(74) *Attorney, Agent, or Firm* — McNees Wallace & Nurick LLC

(57) ABSTRACT

A components comprising a plurality of tab members formed thereon are provided. The plurality of tab members include at least one dissimilar metallic layer applied to the component. The plurality of tab members are configured to extend away from or retract toward a surface of the component in response to a temperature change.

20 Claims, 5 Drawing Sheets

(56) References Cited

U.S. PATENT DOCUMENTS

| | | |
|---|---|---|
| 2008/0085183 A1 | 4/2008 | Durocher et al. |
| 2008/0241547 A1 | 10/2008 | Nalla |
| 2009/0024243 A1 | 1/2009 | Suh |
| 2009/0061232 A1 | 3/2009 | Nalla |
| 2010/0074730 A1 | 3/2010 | Liang |
| 2011/0033760 A1 | 2/2011 | Clarke |
| 2011/0100020 A1 | 5/2011 | Zhang et al. |

OTHER PUBLICATIONS

Fisk Alloy (http://www.fiskalloy.com/products/conductor-facts/tensile-and-elongation/), accessed Nov. 17, 2014.*

* cited by examiner

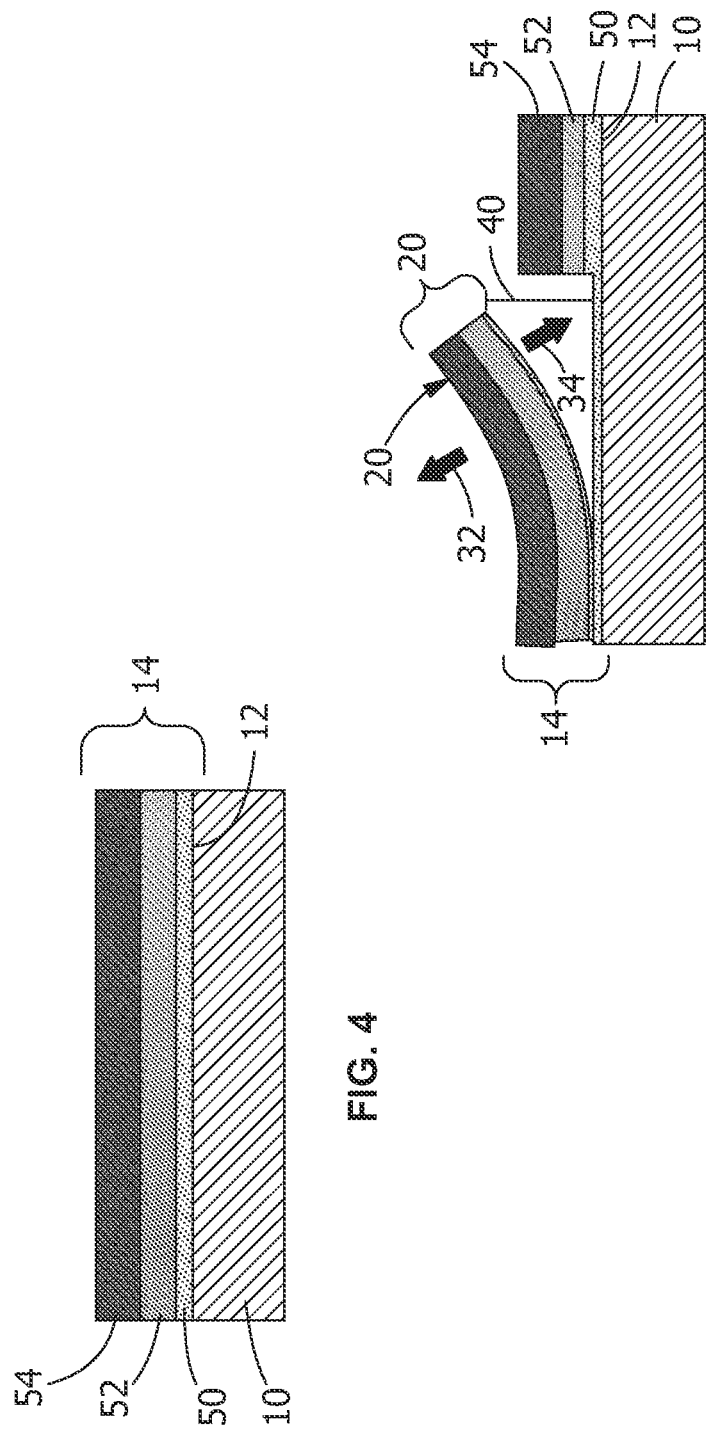

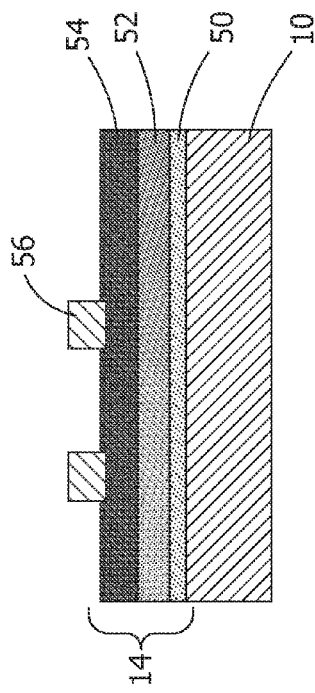
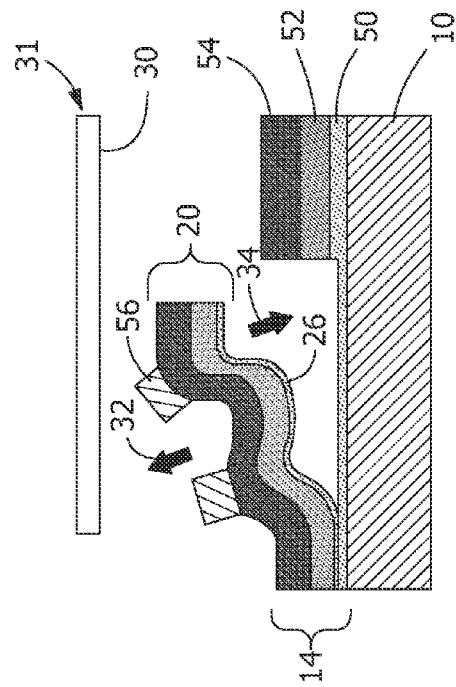
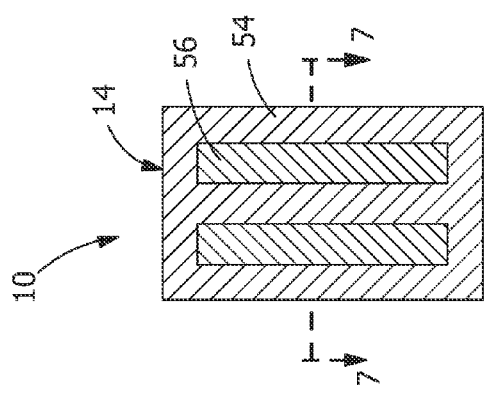

COMPONENTS HAVING TAB MEMBERS

FIELD OF THE INVENTION

The present invention relates generally to components having a plurality of tab members and more specifically to the plurality of tab members including at least one dissimilar metallic layer applied to the component and the plurality of tab members being configured to extend away from or retract toward a surface of the component in response to a temperature change.

BACKGROUND OF THE INVENTION

Sealing and air flow between various components in systems that operate over a large temperature ranges is complicated by vibration, fluctuations in temperature, and spaces between components that grow thermally due to the large operating temperature ranges.

Therefore a component and methods of making the component having a plurality of tab members that are thermally reactive or responsive to temperature change that do not suffer from the above drawbacks is desirable in the art.

SUMMARY OF THE INVENTION

According to an exemplary embodiment of the present disclosure, a component comprising a plurality of tab members formed thereon is provided. The plurality of tab members include at least one dissimilar metallic layer applied to the component. The plurality of tab members being configured to extend away from or retract toward a surface of the component in response to a temperature change According to another exemplary embodiment of the present disclosure, a component comprising a plurality of tab members formed thereon is provided. The plurality of tab members include at least one dissimilar metallic layer applied to the component. The plurality of tab members are configured to extend away from or retract toward a surface of the component in response to a temperature change and wherein the component has a first coefficient of thermal expansion ($\alpha_1$) and the at least one dissimilar metallic layer has a second coefficient of thermal expansion ($\alpha_2$). The difference between the first coefficient of thermal expansion ($\alpha_1$) and the second coefficient of thermal expansion ($\alpha_2$) is at least approximately 5% different.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4 is a schematic view of an exemplary alternative embodiment of at least one dissimilar metallic layer coated on a component of the present disclosure.

FIG. 5 is a schematic of the component of FIG. 4 showing the at least one tab member in an actuated state in response to a temperature change of the present disclosure.

FIG. 6 is a schematic top view of an exemplary alternative embodiment of at least one dissimilar metallic layer coated on a component of the present disclosure.

FIG. 7 is a schematic cross-section view of FIG. 6 taken along line 7-7 of the at least one dissimilar metallic layer coated on a component of the present disclosure.

FIG. 8 is a schematic view of FIG. 7 showing the at least one tab member in an actuated state in response to a temperature change of the present disclosure.

Wherever possible, the same reference numbers will be used throughout the drawings to represent the same parts.

DETAILED DESCRIPTION OF THE INVENTION

Provided is a component having a plurality of tab members and methods of making the components. More specifically, the plurality of tab members include at least one dissimilar metallic layer applied to the component and the plurality of tab members are configured to thermally react by extending away from or retracting toward a surface of the component in response to a temperature change.

One advantage of an embodiment of the present disclosure includes thermally reactive surfaces on components that are responsive to temperature changes. Another advantage of an embodiment is a thermally reactive surface that grows, bends, or cantilevers toward an adjacent surface in response to an increase in temperature. Yet another advantage is a thermally reactive surface that shrinks or retracts toward the surface of the component in response to an increase in temperature. Another advantage of an embodiment is a thermally reactive surface on a component that grows, bends, or cantilevers toward and adjacent surface in response to a decrease in temperature. Another advantage is a thermally reactive surface on a component that shrinks or retracts toward the surface of the component in response to a decrease in temperature.

Components of the present disclosure can be used in any applications that undergo temperature changes, such as, but not limited to, power generation systems which include, but are not limited to, gas turbines, steam turbines, jet turbines, and other turbine assemblies, including wind turbines.

Figure 1:
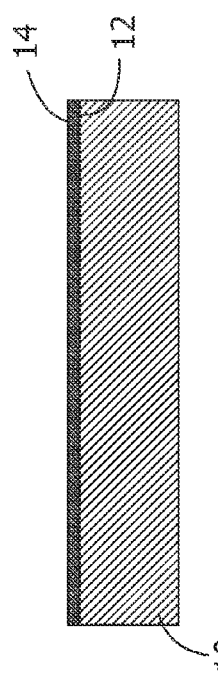
FIG. 1 is a schematic view of a component having at least one dissimilar metallic layer coated thereon of the present disclosure.
Figure 2:
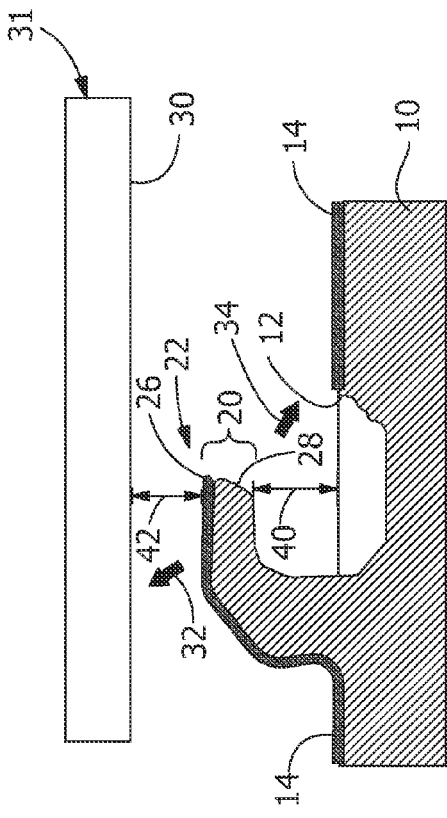
FIG. 2 is a schematic view of at least one tab member formed from a portion of a component having at least one dissimilar metallic layer coated thereon, the tab member shown prior to actuation of the present disclosure.

FIG. 1 is a schematic cross section view of a component 10 including at least one dissimilar metallic layer 14 applied to a surface 12 of component 10, prior to formation of tab members 20 (see FIG. 2). In an alternative embodiment, plurality of tab members 20 are formed in surface 12 of component 10 and then at least one dissimilar metallic layer 14 is applied to surface 12 of component 10 including plurality of tab members 20.

Component 10 includes any metallic components that undergo or are exposed to a temperature change, either by increasing temperature or decreasing temperature, relative to room temperature or 25° C., during use of component 10. As shown in FIG. 1, at least one dissimilar metallic layer 14 is applied to surface 12 of component 10. As used herein, "dissimilar metallic layer" is a metallic layer that has a different composition and different thermal expansion coefficient ($\alpha$) than metallic component 10. At least one dissimilar metallic layer 14 is applied to metallic component 10 in any suitable manner, such as by diffusion bonding, electron beam welding, laser welding, brazing, spraying, sputtering, ion plasma processing, using a melt-solidification process, direct writing deposition process, and combinations thereof. Spraying techniques, include, but are not limited to, thermal spraying, chemical vapor deposition (CVD), physical vapor deposition (PVD), plasma spraying, detonation spraying, wire arc spraying, flame spraying high velocity oxy-fuel coating spraying (HVOF), warm spraying, cold spraying, and combinations thereof.

Component 10 includes metal and is generally selected from materials from the group consisting of nickel, iron, cobalt, stainless steel, aluminum, copper, magnesium, gold, platinum, MCrAlY, wherein in M is Ni, Co, Fe, or combinations thereof, alloys thereof, and combinations thereof. At least one dissimilar metallic layer 14 is selected from a material that is different from component 10 material and has a different thermal expansion coefficient ($\alpha$). At least one dissimilar metallic layer 14 material is selected from the group consisting of nickel, iron, cobalt, stainless steel, aluminum, copper, magnesium, gold, platinum, MCrAlY, wherein in M is Ni, Co, Fe, or combinations thereof, alloys thereof, and combinations thereof. In one embodiment, component 10 material is a 304 stainless steel substrate (available from AK Steel Corporation, West Chester, Ohio) coated with at least one dissimilar metallic layer 14 including a MCrAlY coating.

The difference in thermal expansion coefficients ($\alpha$) between component 10 and at least one dissimilar metallic layer 14 allows plurality of tab members 20 to respond to a predetermined temperature or to temperature changes in surrounding environment. In certain embodiments of the present disclosure, two responses to temperature change are available. As shown in FIGS. 2, 5, and 8, the responses are for tab members to raise up away from surface 12 of component 10 shown by arrow labeled 32 or for the tab members 20 to retract toward surface 12 of component 10 shown by arrow labeled 34. Component 10 has first coefficient of thermal expansion ($\alpha_{component}$) and at least one dissimilar metallic layer has a second coefficient of thermal expansion ($\alpha_{metallic\ layer}$). When temperature response is to have plurality of tab members 20 extend away or raise up away from surface 12 of component 10 (shown by arrowed labeled 32) toward adjacent surface 30 (see FIG. 3) to close gap 42 or reduce air flow with increasing temperature, component 10 is constructed from a metal having a higher coefficient of thermal expansion ($\alpha_{component}$) and at least one dissimilar metallic layer 14 is selected from a metal having a lower coefficient of thermal expansion ($\alpha_{metallic\ layer}$) than component 10. When temperature response is to have plurality of tab members 20 retract toward surface 12 of component 10 (shown by arrow labeled 34 in FIG. 2), to create gap 42 with increasing temperature, component 10 is selected from a metal having a lower coefficient of thermal expansion ($\alpha_{component}$) than at least one dissimilar metallic layer 14 and at least one dissimilar metallic layer 14 is selected from metals having a higher coefficient of thermal expansion ($\alpha_{metallic\ layer}$) than component 10. In one embodiment, irrespective of increasing or decreasing temperature change, the difference between the first coefficient of thermal expansion ($\alpha_{component}$) of component 10 and the second coefficient of thermal expansion ($\alpha_{metallic\ layer}$) of at least one dissimilar metallic layer 14 is at least approximately 5% different. In another embodiment, first coefficient of thermal expansion ($\alpha_{component}$) of component 10 and second coefficient of thermal expansion ($\alpha_{metallic\ layer}$) of at least one dissimilar metallic layer 14 is at least approximately 1.1 times to approximately 2 times different than the a first coefficient of thermal expansion ($\alpha_{component}$).

Suitable examples of materials having a low coefficient of thermal expansion ($\alpha$) of approximately 6 are, but not limited to, CrMoV and NiCrMo. Suitable examples of materials having a medium coefficient of thermal expansion ($\alpha$) of approximately 7, INCONEL® materials, such as, but not limited to, INCONEL®625, INCONEL®718 available from Special Metals Corporation, Huntington, W.Va. Suitable examples of materials having a high coefficient of thermal expansion ($\alpha$) of approximately 9 are, but not limited to, stainless steels, such as, but not limited to, 316 Stainless Steel (UNS S31600, an austenitic chromium, nickel stainless steel containing molybdenum) or 304 Stainless Steel (UNS S30400, a variation of the basic 18-8 grade, Type 302, with a higher chromium and lower carbon content) available from AK Steel, West Chester, Ohio.

In FIG. 2, component 10 includes a single tab member 20, which is shown for clarity; however, surface 12 of component 10 includes at least one tab member 20 in some embodiments and includes a plurality of tab members 20 in other embodiments. In making component 10 having reactive surface, at least one dissimilar metallic layer 14 is applied to 12 surface of component 10. In this embodiment, plurality of tab members 20 are formed to include at least a portion 26 of at least one dissimilar metallic layer 14 applied to component 10. As shown in FIG. 2, at least one tab member 20 includes at least a portion 28 of component 10 and dissimilar metallic layer 14 to form a bi-metallic tab member 20. Plurality of tab members 20 form reactive surface on component 10 because plurality of tab members 20 are configured to extend away from (shown by arrow labeled 32) or retract toward (shown by arrow labeled 34) surface 12 of component 10 in response to a temperature change. The temperature change can be an increase in temperature or a decrease in temperature and plurality of tab member 20 react to the temperature change depending on materials and the material thermal coefficient of thermal expansion ($\alpha$) used for component 10 and at least one dissimilar metallic layer 14.

Applying at least one dissimilar metallic layer 14 includes any suitable application process, such as, but not limited to, laser cladding, thermal spraying, chemical vapor deposition (CVD), plating, powder melting, laser sintering, galvanizing, direct writing, and combinations thereof. Forming plurality of tab members 20 includes any suitable method for cutting or penetrating at least portion 28 of component 10 and at least one dissimilar metallic layer 14 to create plurality of tab members 20 in surface 12 of component 10. Suitable methods for forming plurality of tab members 20, include, but are not limited to, laser surface sculpting methods to form plurality tab members 20. Plurality of tabs members 20 are sculpted into surface 12 of component 10 to form any pattern, such as, but not limited to, rows or lines, dashed rows/lines, slots or elongate holes, fish scales, combinations thereof and other desired patterns.

Figure 3:
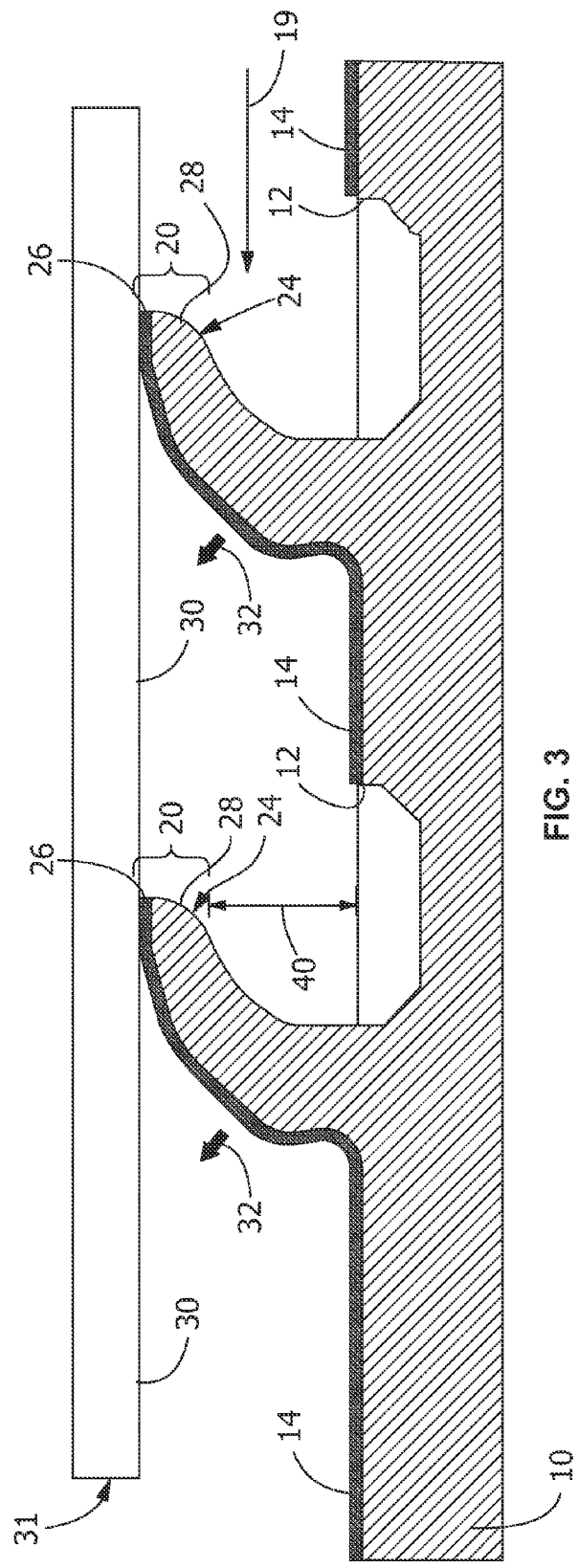
FIG. 3 is a schematic view of a plurality tab members in an actuated state in response to a temperature change of the present disclosure.

FIG. 2 illustrates a single tab member 20 formed on component 10 using a laser surface sculpting process. As shown in FIG. 2, tab member 20 is in an unactuated state 22. In the unactuated state 22, a gap 42 is present between tab member 20 and adjacent surface 30 of second component 31. As shown in FIG. 3, in the actuated state 24, at a predetermined temperature, tab member 20 forms a cantilever that can be used to contact adjacent surfaces 30 of second component 31, thereby providing a sealing function.

In an alternative exemplary embodiment, as shown in FIGS. 4-8, at least one dissimilar metallic layer 14 includes a plurality of metallic layers 50, 52, 54, and 56. Component 10 and at least one dissimilar metallic layer 14 are selected from materials having different thermal expansion coefficients ($\alpha$). As shown in FIGS. 4-5, at least one dissimilar metallic layer 14 includes first metallic layer 50 applied to component 10, second metallic layer 52 applied to first metallic layer 50, and third metallic layer 54 applied to second metallic layer 52. As shown in FIG. 5, at least one tab member 20 includes portion 26 of first metallic layer 50, second metallic layer 52, and third metallic layer 54. As shown in in FIGS. 6-8, at least one dissimilar metallic layer 14 includes first metallic layer 50 applied to component 10, second metallic layer 52 applied to first metallic layer 50, third metallic layer 54 applied to second metallic layer 52, and a fourth metallic layer 56 applied to third metallic layer 54. As shown in FIG. 8, at least one tab member 20 includes portion 26 of first metallic layer 50, second metallic layer 52, third metallic layer 54, and fourth metallic layer 56. Plurality of metallic layers 50, 52, 54, and 56 forming tab members 20 are applied using any suitable application technique, such as, but not limited to, diffusion bonding, electron beam welding, laser welding, brazing, spraying, sputtering, ion plasma processing, using a melt-solidification process, direct writing deposition process, and combinations thereof. Spraying techniques, include, but are not limited to, thermal spraying, chemical vapor deposition (CVD), physical vapor deposition (PVD), plasma spraying, detonation spraying, wire arc spraying, flame spraying, high velocity oxy-fuel coating spraying (HVOF), warm spraying, cold spraying, and combinations thereof.

As shown in FIGS. 4-5, first metallic layer 50, second metallic layer 52, and third metallic layer 54 are applied to component 10. As shown in FIG. 5, at least one tab member 20 includes portion 26 of first metallic layer 50, second metallic layer 52, and third metallic layer 54. In an exemplary embodiment, first metallic layer 50 applied to component 10 is a weaker or more brittle metallic layer than second metallic layer 52 and third metallic layer 54. As used herein, "brittle" indicates that first metallic layer 50 weaker and less ductile than second metallic layer 52 and third metallic layer 54. Generally, first metallic layer 50 is a material with a tensile elongation at failure of less than 10%. Additionally, first metallic layer 50 has a porosity of approximately 0% by volume to approximately 50% by volume. First metallic layer 50 is configured to be broken when mechanical stress or other stress is applied to the at least one dissimilar metallic layer 14. Third metallic layer 54 is a strong metallic layer having a different coefficient of thermal expansion ($\alpha$) than second metallic layer 52. In one embodiment, third metallic layer 54 is selected from a material having a coefficient of thermal expansion ($\alpha$) that is up to about the same or about 20% different than first metallic layer 50 and second metallic layer 52. The 20% difference is either greater than or less than, depending on the desired movement of tab member 20. Suitable examples of first metallic layer 50 include, but are not limited to, nickel-aluminum, titanium-aluminum, nickel-chromium carbide, cobalt-chromium carbide, alloys thereof and combinations thereof. Suitable examples of materials for second metallic layer 52 and third metallic layer 54 include, but are not limited to, nickel, iron, cobalt, stainless steel, aluminum, copper, magnesium, gold, platinum, MCrAlY, wherein in M is Ni, Co, Fe, or combinations thereof, alloys thereof, and combinations thereof.

In one exemplary embodiment, plurality of tab members 20 are created by breaking, fracturing or disrupting brittle first metallic layer 50. Suitable methods used for breaking, fracturing or disrupting brittle first metallic layer 50 include, but are not limited to, applying a pulsed laser, applying targeted mechanical shock or mechanical stress, and applying targeted mechanical shock and thermal shock to plurality of dissimilar layers 14. In one embodiment, a pulsed laser is applied to plurality of dissimilar layers 14, and the pulsed laser penetrates through third metallic layer 54 and second metallic layer 52 to first metallic layer 50 causing brittle first metallic layer 50 to fracture or break. The fractured first metallic layer 50 allows for a larger area of dis-bonding, thereby providing tab members 20 having features that are taller or larger relative perpendicularly to surface 12 of component 10.

As shown in FIG. 5, temperature change causes two responses from tab members 20 to bend away or raise up from surface 12 of component 10 shown by arrow labeled 32 or to retract toward surface 12 of component 10 shown by arrow labeled 34. Component 10 has first coefficient of thermal expansion ($\alpha_{component}$) and dissimilar metallic layers 14 include a number of coefficients for each separate metallic layer, first metallic layer 50 has coefficient of thermal expansion ($\alpha_{first}$), second metallic layer 52 has coefficient of thermal expansion ($\alpha_{second}$), and third metallic layer 54 has coefficient of thermal expansion ($\alpha_{third}$). When temperature response is to have plurality of tab members 20 extend away or raise up away from surface 12 of component 10 (shown by arrowed labeled 32), first metallic layer 50 and second metallic layers 52 have higher coefficients of thermal expansion ($\alpha_{first}$) and ($\alpha_{second}$) than coefficient of thermal expansion ($\alpha_{third}$) of third metallic layer 54 ($\alpha_{third}$). When temperature response is to have plurality of tab members 20 retract toward surface 12 of component 10 (shown by arrow labeled 34) with increasing temperature, first metallic layer 50 and second metallic layers 52 have lower coefficients of thermal expansion ($=_{first}$) and ($\alpha_{second}$) than the coefficient of thermal expansion ($\alpha_{third}$) of third metallic layer 54.

Generally, to effectuate a response to a predetermined temperature or temperature change, a misfit strain of at least 8% between the materials of second metallic layer 52 and third metallic layer 54 of plurality of metallic layers 14 is needed. Misfit strain ($\epsilon$) is the difference between the coefficients of thermal expansion ($\alpha$) at a temperature gradient and is calculated using the following equation:

$$\epsilon = (\alpha_{second} - \alpha_{third})\Delta T$$

where $\epsilon$ is misfit strain; $\alpha_{second}$ and $\alpha_{third}$ are the coefficient of thermal expansion of second metallic layer 52 and coefficient of thermal expansion of third metallic layer 54, respectively; and $\Delta T$ is the temperature gradient, which is the current temperature minus the reference temperature. The reference temperature is the temperature at which the tab member 20 has no flexure or movement.

In one embodiment, plurality of tab members 20 have a greater than approximately 10% change in height 40 to approximately 50% change in height 40, or alternatively approximately 15% change in height 40 to approximately 45% change in height 40 to approximately 20% to approximately 30% change in height 40 (see FIGS. 2-3) in response to a temperature change. Tab member 20 dimensions depend on length and thickness of tab member 20 and material types used for at least one dissimilar metallic layer 14 and each of the layers, first, second, third, and fourth metallic layers 50, 52, 54, and 56. Additionally, relative values or misfit strain between the second metallic layer 52 and third metallic layer 54 impact height change of plurality of tab members 20. In one exemplary embodiment, tab members 20 are configured to regulate air flow 19 systems in response to temperature changes. In an alternative exemplary embodiment, tab members 20 are configured to increase or throttle air flow 19 systems in response to temperature changes.

In another exemplary embodiment, as shown in FIGS. 6-9, dissimilar metallic layer 14 includes first metallic layer 50 applied to surface 12 of component 10, second metallic layer 52 applied to first metallic layer 50, third metallic layer 54 applied to second metallic layer 52, and fourth metallic layer 56 applied to third metallic layer 54. FIG. 6 is a top view of component 10 showing third metallic layer 54 and fourth metallic layer 54 of plurality of dissimilar metallic layers 14. Placement of metallic layers can be in any position on the component 10. As shown in FIGS. 6-8, a portion of fourth metallic layer 56 is removed. Fourth metallic layer 56 is removed using any suitable technique such as grinding, blasting, or other removal techniques. After portion of fourth metallic layer 56 is removed, plurality of dissimilar metallic layers 14 are laser sculpted creating plurality tab members 20 on component 10. Alternatively, if first metallic layer 50 is a "brittle" layer, methods such as breaking, fracturing or disrupting brittle first metallic layer 50 are used to form tab members 20 as described above. The plurality of metallic layer 14 shown in FIGS. 6-8 operate in the same manner as the plurality of metallic layers 14 shown in FIGS. 4-5, such that depending on the coefficient of thermal expansion of each of plurality of metallic layers 14, tab member 20 will respond to temperature changes.

Figure 9:
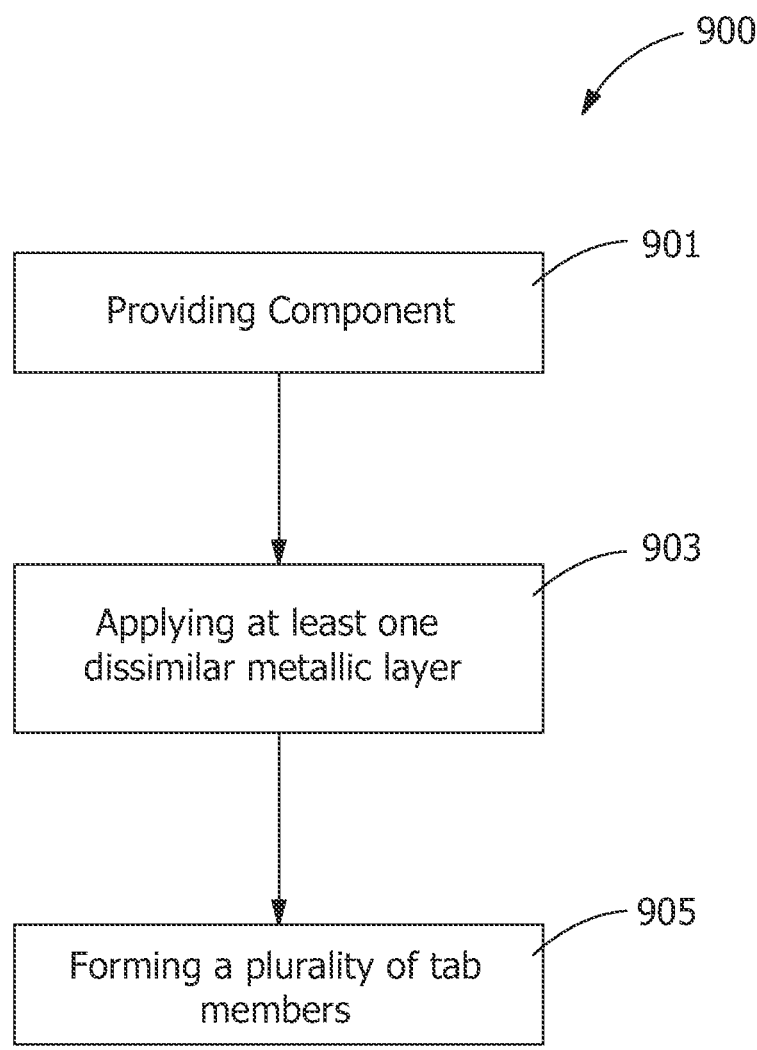
FIG. 9 is a flow chart of an exemplary method of making a plurality of tab members on a component of the present disclosure.

FIG. 9 illustrates a method 900 of forming components 10 having plurality of tab members 20 (see FIGS. 2, 5, and 8). Method 900 includes providing component 10, step 901. Method 900 includes applying at least one dissimilar metallic layer 14 to surface 12 of component 10 (see FIGS. 1, 4 and 7), step 903. Method 900 includes forming plurality of tab members 20 (see FIGS. 2, 5, and 8), step 905. Plurality of tab members 20 include at least a portion 26 of the at least one dissimilar metallic layer 14 applied to component 10. Plurality of tab members 20 are configured to extend away from or retract toward surface 12 of component 20 in response to a temperature change. Plurality of tab members 20 are formed using any suitable techniques such as laser sculpting methods or applying mechanical stress. Step of applying, step 903, includes applying first metallic layer 50 to component 10, applying second metallic layer 52 to first metallic layer 50, and optionally applying third metallic layer 54 to second metallic layer 52 (see FIG. 4). Step of forming, step 905, includes applying mechanical stress to at least one dissimilar metallic layer 14 to form plurality of tab members 20, wherein plurality of tab members 20 include portion 26 of first metallic layer 50, second metallic layer 52 and third metallic layer 54 (see FIG. 4). Method 900 includes, after the step of forming, step 905, depositing third metallic layer 54 on plurality of tab members 20 formed from portion 26 of first metallic layer 50 and second metallic layer 52, wherein plurality of tab members 20 include portion of 26 first metallic layer 50, second metallic layer 52 and deposited third 54.

Figure 10:
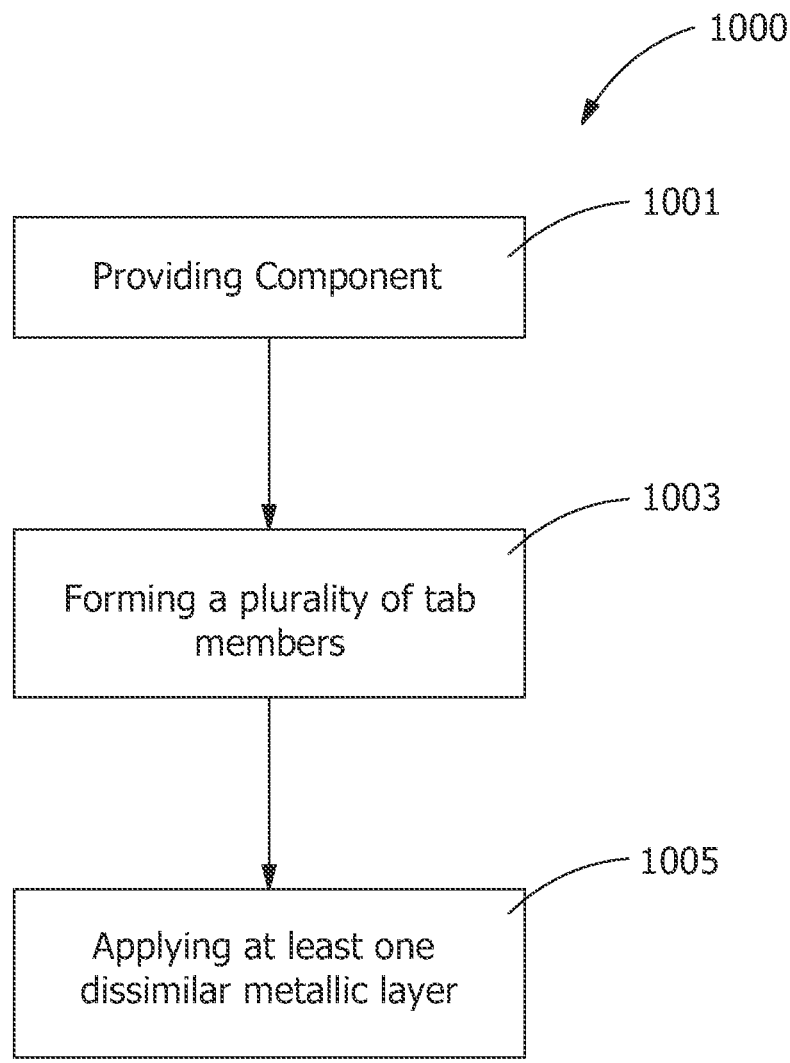
FIG. 10 is a flow chart of an alternative exemplary method of making a plurality of tab members on a component of the present disclosure.

FIG. 10 illustrates method 1000 of forming component 10 having plurality of tab members 20. Method 1000 includes providing component 10, step 1001. Method 1000 includes forming plurality of tab members 20 in surface 12 of component 10, step 1003. Method 1000 includes applying at least one dissimilar metallic layer 14 to plurality of formed tab members 20 of component 10, step 1005. Plurality of tab members 20 are configured to extend away from or retract toward surface 12 of component 10 in response to a temperature change. Step of applying at least one dissimilar metallic layer 14 on plurality of tab members 20, step 1005, includes thermal spraying, cold spraying, welding, laser sintering, laser cladding, direct writing, and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A component comprising a plurality of tab members formed thereon, wherein the plurality of tab members include at least one dissimilar metallic layer applied to the component, the plurality of tab members being configured to extend away from or retract toward a surface of the component in response to a temperature change wherein the tab member is sculpted into the component, is formed from a portion of the component and includes a cantilever from the surface of the component.

2. The component of claim 1, wherein the plurality of tab members include a portion of the component.

3. The component of claim 2, wherein the at least one dissimilar metallic layer includes a first metallic layer and a second metallic layer.

4. The component of claim 1, wherein the component and at least one dissimilar metallic layer are independently selected from the group consisting of nickel, iron, cobalt, stainless steel, aluminum, copper, magnesium, gold, platinum, MCrAlY, wherein M is Ni, Co, Fe, or combinations thereof, alloys thereof, and combinations thereof.

5. The component of claim 1, wherein the component has a first coefficient of thermal expansion ($\alpha_1$) and the at least one dissimilar metallic layer has a second coefficient of thermal expansion ($\alpha_2$), wherein the difference between the first coefficient of thermal expansion ($\alpha_1$) and the second coefficient of thermal expansion ($\alpha_2$) is at least approximately 5% different.

6. The component of claim 1, wherein the component has a first coefficient of thermal expansion ($\alpha_1$) and the at least one dissimilar metallic layer has a second coefficient of thermal expansion ($\alpha_2$), wherein the difference between the first coefficient of thermal expansion ($\alpha_1$) and the second coefficient of thermal expansion ($\alpha_2$) is at least approximately 1.1 times to approximately 2 times different.

7. The component of claim 5, wherein the plurality of tab members are configured to extend away from the surface with an increasing temperature when the first coefficient of thermal expansion ($\alpha_1$) of the component is greater than the second coefficient ($\alpha_2$) of thermal expansion of the at least one dissimilar metallic layer.

8. The component of claim 5, wherein the plurality of tab members are configured to retract toward the surface of the component with an increasing temperature when the first coefficient of thermal expansion ($\alpha_1$) of the component is less than the second coefficient ($\alpha_2$) of thermal expansion of the at least one dissimilar metallic layer.

9. A component comprising a plurality of tab members formed thereon, wherein the plurality of tab members include at least one dissimilar metallic layer applied to the component, the plurality of tab members being configured to extend away from or retract toward a surface of the component in response to a temperature change, wherein the at least one dissimilar metallic layer includes a first metallic layer applied to the component, a second metallic layer applied to the first metallic layer, and a third metallic layer applied to the second metallic layer and the tab member includes a fractured first metallic layer.

10. The component of claim 9, wherein the first metallic layer is selected from the group consisting of nickel-aluminum, titanium-aluminum, nickel-chromium carbide, cobalt-chromium carbide, alloys thereof and combinations thereof.

11. The component of claim 9, wherein the first metallic layer comprises a brittle material having a tensile elongation at failure of less than 10%, wherein the first metallic layer is configured to be broken when mechanical stress is applied to the at least one dissimilar metallic layer.

12. The component of claim 9, wherein the first metallic layer has a porosity of approximately 0% by volume to approximately 50% by volume, wherein the first metallic layer is configured to be broken when mechanical stress is applied to the at least one dissimilar metallic layer.

13. The component of claim 9, wherein the first metallic layer is applied using laser cladding, thermal spraying, chemical vapor deposition (CVD), plating, powder melting, laser sintering, galvanizing, direct writing, welding, cold spraying and combinations thereof.

14. The component of claim 9, wherein a portion of the first metallic layer, the second metallic layer and the third metallic layer form the plurality of tab members.

15. The component of claim 9, wherein a portion of the third metallic layer is removed from the second metallic layer to form a pattern.

16. A component comprising a plurality of tab members formed thereon, wherein the plurality of tab members include at least one dissimilar metallic layer applied to the component, the plurality of tab members being configured to extend away from or retract toward a surface of the component in response to a temperature change, wherein the component has a first coefficient of thermal expansion ($\alpha_1$) and the at least one dissimilar metallic layer has a second coefficient of thermal expansion ($\alpha_2$), wherein the difference between the first coefficient of thermal expansion ($\alpha_1$) and the second coefficient of thermal expansion ($\alpha_2$) is at least approximately 5% different, and wherein the tab member includes a fractured first metallic layer.

17. The component of claim 16, wherein the at least one dissimilar metallic layer includes a first metallic layer, a second metallic layer and a third metallic layer.

18. The component of claim 17, wherein the plurality of tab members are formed by applying mechanical stress to the at least one dissimilar metallic layer to form the plurality of tab members, wherein the plurality of tab members include a portion of the first metallic layer, the second metallic layer and the third metallic layer.

19. The component of claim 17, wherein a portion of the third metallic layer is removed from the second metallic layer.

20. The component of claim 16, wherein the plurality of tab members are formed by using a laser sculpting method, wherein the plurality of tab members include a portion of the component and at least one dissimilar metallic layer.

* * * * *

UNITED STATES PATENT AND TRADEMARK OFFICE
CERTIFICATE OF CORRECTION

PATENT NO. : 9,169,567 B2  
APPLICATION NO. : 13/436420  
DATED : October 27, 2015  
INVENTOR(S) : Hefner et al.

Page 1 of 1

It is certified that error appears in the above-identified patent and that said Letters Patent is hereby corrected as shown below:

In the Specification

In Column 3, Line 9, delete "flame spraying" and insert -- flame spraying, --, therefor.

In Column 3, Line 58, delete "($\alpha_{metallie\ layer}$)" and insert -- ($\alpha_{metallic\ layer}$) --, therefor.

In Column 6, Line 32, delete "($=_{first}$)" and insert -- ($\alpha_{first}$) --, therefor.

In the Claims

In Column 8, Line 21, in Claim 1, delete "cantiveler" and insert -- cantilever --, therefor.

Signed and Sealed this  
Twenty-third Day of August, 2016

Michelle K. Lee  
*Director of the United States Patent and Trademark Office*